United States Patent
Jandric et al.

(10) Patent No.: US 9,558,775 B2
(45) Date of Patent: Jan. 31, 2017

(54) LASER DIODE SUBMOUNT/SLIDER INTERFACE WITH REDUCED THERMAL RESISTANCE

(71) Applicant: Seagate Technology LLC, Cupertino, CA (US)

(72) Inventors: Zoran Jandric, St. Louis Park, MN (US); Ning Shi, Bloomington, MN (US); James Gary Wessel, Savage, MN (US); Lars Ahlen, Bloomington, MN (US); Neil Zuckerman, Eden Prairie, MN (US); Tyler Perry, Cottage Grove, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/626,707

(22) Filed: Feb. 19, 2015

(65) Prior Publication Data

US 2016/0247528 A1   Aug. 25, 2016

(51) Int. Cl.
| | | |
|---|---|---|
| *G11B 5/60* | (2006.01) | |
| *G11B 5/48* | (2006.01) | |
| *G11B 5/31* | (2006.01) | |
| *G11B 5/105* | (2006.01) | |
| *G11B 5/00* | (2006.01) | |

(52) U.S. Cl.
CPC ............ *G11B 5/6088* (2013.01); *G11B 5/105* (2013.01); *G11B 5/314* (2013.01); *G11B 5/4866* (2013.01); *G11B 2005/0021* (2013.01)

(58) Field of Classification Search
CPC ................ G11B 2005/001; G11B 2005/0021; G11B 5/314; G11B 5/40; G11B 5/4866; G11B 5/6088; G11B 5/105
See application file for complete search history.

(56) References Cited

U.S. PATENT DOCUMENTS

| | | | |
|---|---|---|---|
| 8,477,570 B2 | 7/2013 | Arai et al. | |
| 8,824,247 B2 | 9/2014 | Hurley et al. | |
| 8,866,041 B2 | 10/2014 | Shimazawa et al. | |
| 2011/0216635 A1* | 9/2011 | Matsumoto | G11B 5/105 369/13.33 |
| 2013/0322221 A1* | 12/2013 | Naniwa | G11B 5/314 369/13.33 |
| 2014/0092715 A1* | 4/2014 | Shi | G11B 5/6088 369/13.24 |
| 2014/0104996 A1* | 4/2014 | Tsuchiyama | G11B 5/4826 369/13.17 |
| 2015/0154988 A1* | 6/2015 | Takei | G11B 5/6088 369/13.14 |

\* cited by examiner

*Primary Examiner* — Dionne H Pendleton
(74) *Attorney, Agent, or Firm* — Hollingsworth Davis, LLC (57) ABSTRACT

An apparatus comprises a slider of a magnetic recording head, a submount, and an interface defined between the slider and the submount. A laser diode is connected to the submount. A metal layer is provided at the interface between the slider and the submount. The metal layer connects at least about 30% of the surface area of the submount at the interface to the slider and serves as a thermal conduction pathway between the submount and the slider.

21 Claims, 12 Drawing Sheets

LASER DIODE SUBMOUNT/SLIDER INTERFACE WITH REDUCED THERMAL RESISTANCE

SUMMARY

Embodiments of the disclosure are directed to an apparatus comprising a slider of a magnetic recording head, a submount, and an interface defined between the slider and the submount. A laser diode is connected to the submount. A metal layer is provided at the interface between the slider and the submount. The metal layer connects at least about 30% of the surface area of the submount at the interface to the slider and serves as a thermal conduction pathway between the submount and the slider.

Other embodiments are directed to an apparatus comprising a slider of a magnetic recording head. The slider comprises an air bearing surface and a surface opposing the air bearing surface. A trench is provided on the opposing surface, with a first metal layer in the trench. A submount has an end surface terminating at an interface defined between the slider and the submount. A laser diode is connected to the submount, and a second metal layer is provided on the end surface of the submount. The first metal layer connects at least about 30% of the surface area of the end surface to the opposing surface of the slider via the second metal layer and serves as a thermal conduction pathway between the submount and the slider.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure is generally directed to sliders used in magnetic recording devices such as hard drives. In particular, this disclosure relates to sliders implemented for heat-assisted magnetic recording (HAMR), also referred to as thermally assisted magnetic recording (TAMR), which can be used to increase areal data density of magnetic media. Generally, a HAMR read-write head includes electromagnetic components similar to a conventional magnetic hard drive read/write head (often referred to generally as a slider), such as a writer and a reader. A HAMR read/write head also includes a source of energy (e.g., a laser) used for heating a small spot on a magnetic media (e.g., disk). The laser energy is used to excite a near-field transducer near the magnetic writer to create a precisely focused thermal spot on the magnetic media. A HAMR device uses a magnetic storage media with higher coercivity than conventional magnetic media, and the hotspot temporarily lowers the coercivity so that data can be written to the heated area. This generally allows for higher areal density to be achieved than with current magnetic recording technologies.

Figure 1:
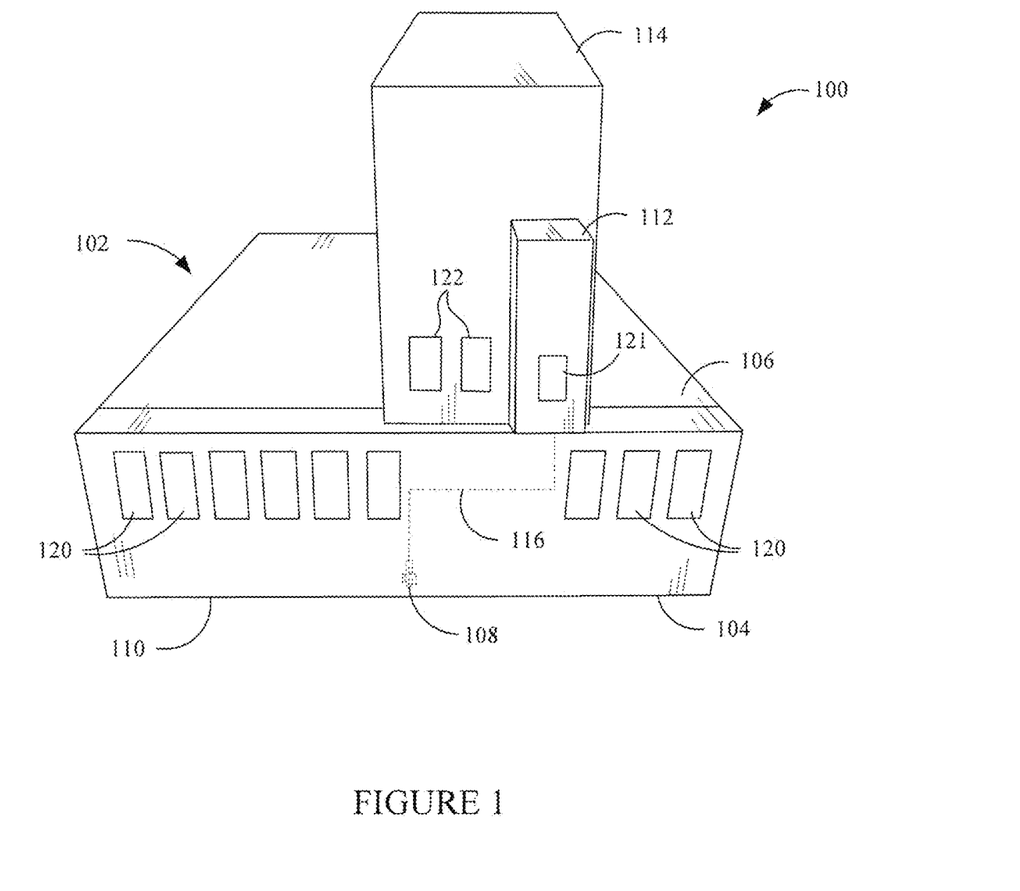
FIG. 1 is a perspective view of a hard drive slider that includes a laser diode supported by a submount.

In a number of existing HAMR designs, a laser is manufactured separately from the slider that houses the read/write head. The laser can be physically attached to the slider, or attached elsewhere and optically coupled to the slider (e.g., via an optic fiber). The present disclosure relates to one example of the former arrangement, referred to herein as laser-on-slider (LOS). In FIG. 1, a perspective view shows an LOS assembly 100 according to a representative embodiment.

The slider assembly 100 includes a slider body 102 having a media-facing surface 104 and a top surface 106. The media-facing surface 104 faces a magnetic media surface (e.g., disk surface, not shown) during operation. A read/write head region 108 is located at the media-facing surface 104 near a trailing edge 110 of the slider body. The read/write head region 108 includes respective one or more read transducers and write transducers, as well as an optical component (e.g., a near-field transducer) that directs a small beam of energy onto the media surface. The read/write head region 108 generally includes an alumina overcoat. The energy is provided by a laser diode 112 attached to a submount 114, both of which are attached to the top surface 106 of the slider body 102.

The laser diode 112 directs light to an optical interface (not shown) of the slider body 102, where it is coupled to a waveguide 116 that directs light to the read/write head region 108. The laser diode 112 in this example is an edge-emitting laser diode, and may be coupled to the waveguide 116 via a facet, grating, lens or other coupling structure known in the art. Generally, the slider body 102 is an integrated optics device that is formed together with the waveguide 116 and read/write head region 108.

The field of integrated optics relates to the construction of optics devices on substrates, sometimes in combination with electronic components, to produce functional systems or subsystems. The processes used are similar to those used in semiconductor fabrication, e.g., layer deposition, photo-masking, etching, etc. For example, a component such as the waveguide 116 may be formed as a layer of materials with appropriate relative refractive indices so that light propagates through the waveguide in a manner similar to an optic fiber. The laser diode 112 and submount 114 may also be formed using integrated optics and/or integrated circuit manufacturing processes. However, in this representative example, the laser diode 112 and submount 114 are not formed together with the slider body 102 in the same layer deposition process. The laser diode 112 and submount 114 are formed separately and later attached together (e.g., using pick and place then solder reflow bonding) with the slider body 102 to form the slider assembly 100. The slider body 102, laser diode 112, and submount 114 have electrical connecting pads 120-122 that attach with other structures that are part of what is referred to as a head-gimbal assembly.

As discussed above, a HAMR drive uses a laser diode to heat the media to aid in the recording process. Due to inefficiencies of electric to optical power conversion, the laser diode also heats itself during lasing. Components (writer, reader, heat elements) in the magnetic slider also dissipate heat and the heat is conducted to laser diode as the laser diode submount is mounted on the slider. These components (including the laser diode) can experience significant heating due to light absorption and electric-to-optical conversion inefficiencies as energy produced by the laser diode is delivered to the magnetic recording medium (not shown). During write operation, these light absorption and inefficiencies will vary the junction temperature of the laser diode, causing a shift in laser emission wavelength, leading to a change of optical feedback from optical path in slider to the cavity of the laser diode, a phenomenon that is known to lead to mode hopping/power instability of the laser diode.

Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Some of the physical mechanisms for thermally-induced mode hopping are thought to be temperature dependence of laser gain, index of refraction, and cavity length. Mode hopping is problematic for HAMR applications, as mode hopping leads to laser output power jumping and magnetic transition shifting from one block of data to another. Large transition shifts in a block of data may not be recoverable by channel decoding, resulting in error bits. Embodiments of the disclosure are directed to apparatuses that provide for an increase in thermal conduction (e.g., a reduction in thermal resistance) between the submount and the slider body, resulting in lower laser diode temperature excursions and a reduced likelihood of mode hopping. Embodiments that provide for reduced thermal resistance (i.e., increased thermal conduction) between the submount and the slider body facilitate an increase in service life of the laser diode, increased efficiency due to reduced operating temperatures, and increased stability and reliability of the laser diode during write operations (e.g., a reduced likelihood of mode hopping).

Figure 2:
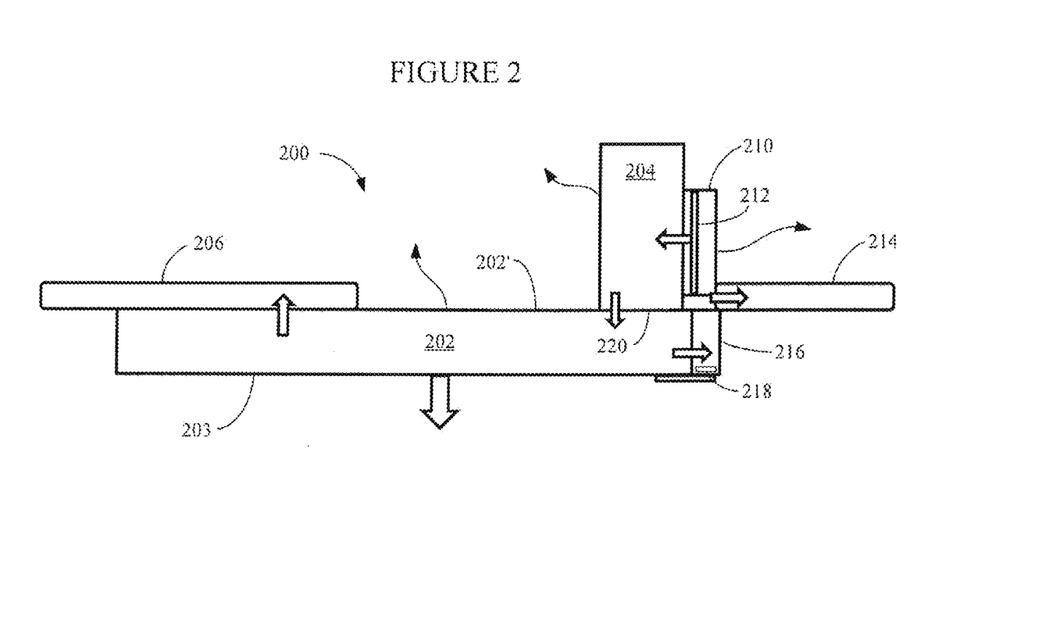
FIG. 2 illustrates a slider arrangement for which thermal modeling was performed in order to assess the thermal environment of the slider arrangement during normal operation.

FIG. 2 illustrates a slider arrangement 200 for which thermal modeling was performed in order to assess the thermal environment of the slider arrangement 200 during normal operation. The thermal modeling was performed to simulate a realistic disk drive operating environment, with the media spinning at 10,000 RPM and conduction and convection heat transfer being evaluated using known modeling techniques, including computational fluid dynamics (CFD). The slider arrangement 200 includes a slider body 202 to which is connected a suspension 206 at the leading edge of the slider body 202 and a submount 204 at the trailing edge of the slider body 202. The terminal end of the trailing edge of the slider body 202 includes an alumina overcoat 216 and the various transducers (reader, writer, near-field transducer) 218. Connected to the submount 204 is a laser diode 210, which includes an active region or junction 212. Coupled to the slider body arrangement 200 are number of traces 214, which provide for electrical connectivity between components of the slider arrangement 200 and external components.

The illustration of FIG. 2 shows a number of arrows which indicate the direction of heat transfer between the various components of the slider arrangement 200 due to one or both of conduction and convection. Thermal modeling revealed the following metrics of energy transferred between the various components of the slider arrangement 200. It was found that 96% of the heat generated by the laser diode 210 was transferred to the submount 204 via conduction, and only 1% was transferred to the environment via convection. Three percent of the heat generated by the laser diode 210 was transferred via conduction to the traces 214. It was also found that 93% of the heat at the submount 204 was transferred to the slider body 202 via conduction at the submount/slider body interface, while only 3% of the submount heat was transferred to the environment via convection.

It was further determined that 9% of heat at the slider body 202 conducted to the alumina overcoat 216, 5% of this heat conducted to the suspension 206, 2% of the heat transferred to the environment from the upper surface 202' of the slider body 202 to the environment, and 86% of the slider body heat transferred through conduction to the air bearing surface 203 of the slider body 202, which then transferred to the environment via one or both of convection and conduction. The key factor revealed by the thermal modeling was that the vast majority of thermal energy produced by the laser diode 210 transferred to the slider body 202 via the interface between the submount 204 and the slider body 202, resulting in 86% of this thermal energy being transferred through conduction to the air bearing surface 203 of the slider body 202.

Figure 3:
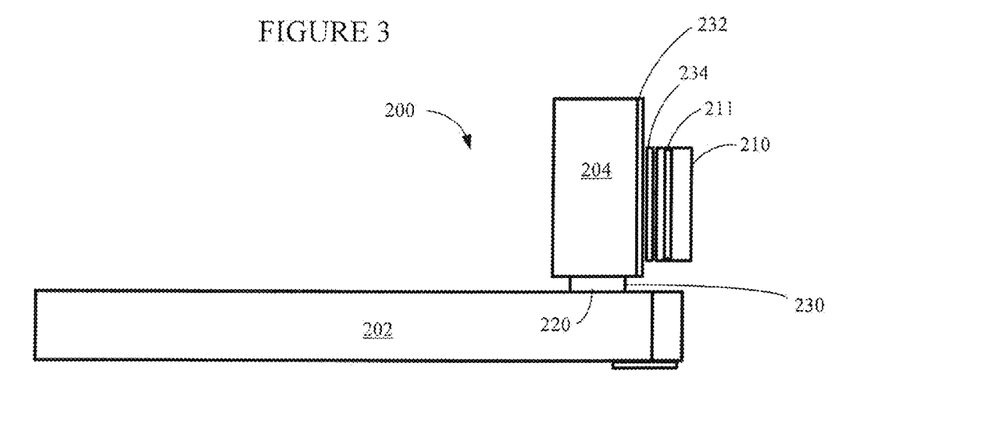
FIG. 3 is a simplified view of the slider arrangement shown in FIG. 2.

Additional modeling was performed to evaluate the thermal resistance between the various components of the slider arrangement 200 shown in FIG. 2, a simplified version of which is shown in FIG. 3. Using thermal resistance network modeling, the following thermal resistance values for the various components shown in FIG. 2 were determined. The submount 204, formed from silicon (Si), had a thermal resistance, $R_{th}$, of about 5 K/W. The trailing edge surface of the submount 204 includes a layer 232 of silicon oxide (SiO$_2$) with $R_{th}$=30 K/W. Adjacent to the silicon oxide layer 232 is an under bump metallization (UBM) layer 234 (also referred to herein as a UBM/solder layer) with $R^{eq}_{th}$=0.7 K/W. A gallium arsenide (GaAs) layer 211 of the laser diode 210 with $R_{th}$=5.8 K/W contacts the UBM layer 234. The slider body 202, formed from AlTiC, had a thermal resistance of $R_{th}$ of ~30 K/W.

Disposed between the submount 204 and the slider body 202 is a UBM layer 230 (also referred to as a UBM/solder layer or, more generally, a metallization layer) with $R^{eq}_{th}$=2.5 K/W. The thermal resistance network modeling revealed high thermal gradients between the laser diode 210 and the submount 204, and between the submount 204 and the slider body 202. It is known that thermal resistance is given by the equation $R_{th}$=L/kA, where L is length of the material, k is thermal conductivity of the material, and A is the cross-sectional area (perpendicular to the path of heat flow) of the material. Embodiments of the disclosure are directed to increasing the cross-sectional area of the interface between the submount 204 and the slider body 202, thereby reducing thermal resistance at the interface.

Figures 4, 5:
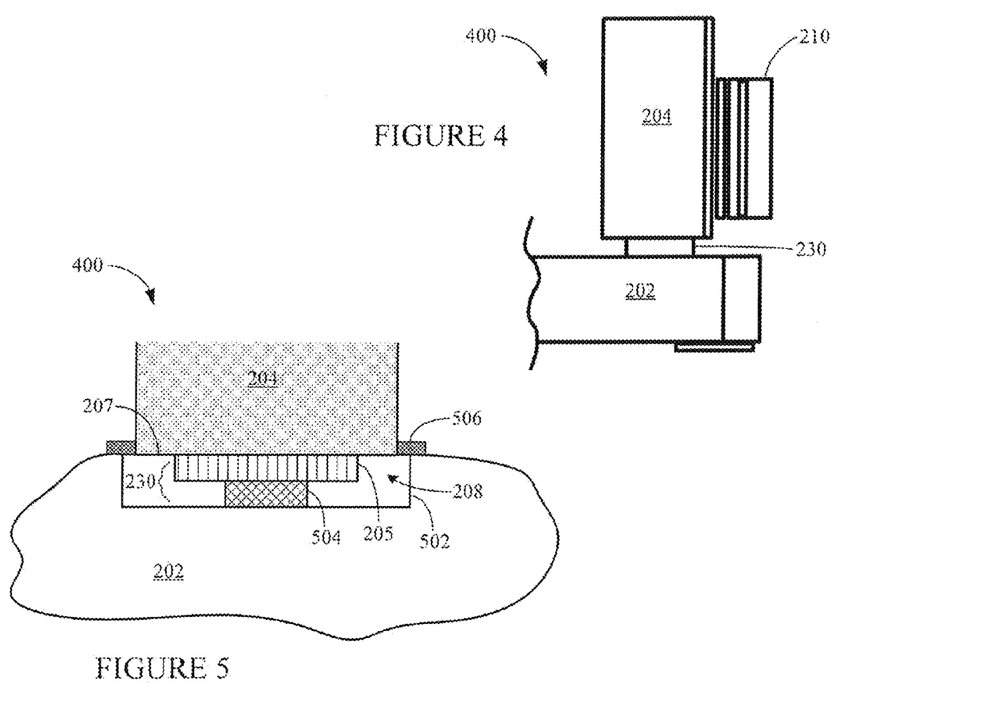
FIG. 4 illustrates a baseline slider arrangement design in which heat produced by a laser diode is conducted from a submount to a slider body via a metallization layer.
FIG. 5 is an illustration showing additional details of the baseline configuration shown in FIG. 4.

The slider arrangement 400 shown in FIG. 4 is a simplified version of that shown in FIG. 3. FIG. 4 represents a baseline slider arrangement design in which heat produced by the laser diode 210 is conducted from the submount 204 to the slider body 202 via the metallization layer 230. In the representative baseline slider arrangement 400 shown in FIG. 4, metallization layer 230 is in contact with approximately 25% of the surface area of the submount 204 adjacent the slider body 202. It is noted that a coverage percentage of about 25% (i.e., total surface area of the submount surface adjacent slider body 202 and covered by the metallization layer 230) may be adequate in some system implementations, but that embodiments of the present disclosure are directed to increased coverage percentages that provide for enhanced transfer of heat from the submount 204 to the slider body 202.

FIG. 5 is an illustration showing additional details of the baseline configuration shown in FIG. 4. It is understood that the baseline configuration shown in FIGS. 4 and 5 does not constitute a conventional arrangement, but instead represents a configuration upon which improvements according to various embodiments of the disclosure can be realized. In FIG. 5, a submount 204 is shown physically and thermally coupled to a slider body 202 via a metallization layer 230. The metallization layer 230 is disposed in a trench 502 formed on the surface of the slider body 202. In the configuration shown in FIG. 5, the metallization layer 230 comprises a first metal layer 504 provided in the trench 502 of the slider body 202. The metallization layer 230 further comprises a second metal layer 205 provided on an end surface 207 of the submount 204 that terminates at an interface 208 defined between the slider body 202 and the submount 204. FIG. 5 further shows an antireflective coating (AR coating) 506 disposed at the base of the submount 204 on two opposing sides of the submount 204. It is important that the metallization layer 230 at the interface between the submount 204 and the slider body 202 not disturb the AR coating 506.

Figure 6:
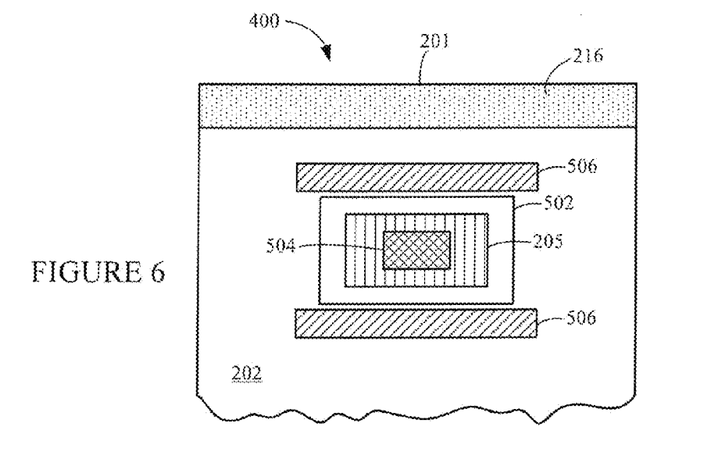
FIG. 6 is a cross-sectional top view of the baseline configuration shown in FIGS. 4 and 5.

FIG. 6 is a cross-sectional top view of the baseline configuration shown in FIGS. 4 and 5 showing features at the interface 208 between the submount 204 (not shown in FIG. 6) and the slider body 202. The baseline slider arrangement 400 shown in FIG. 6 includes a portion of the slider body 202 and the alumina overcoat 216 provided at the trailing edge 201 of the slider body 202. The top view of FIG. 6 further shows the trench 502 provided on a surface of the slider body 202 opposite to the air bearing surface. FIG. 6 also shows the second metal layer 205 on the submount 204 (not shown in FIG. 6) and the first metal layer 504 within the trench 502. The AR coating layers 506 are shown positioned proximate a base portion of the submount 204 (not shown in FIG. 6) and extending parallel to the trailing edge 201 of the slider body 202. As was discussed previously, the metallization layer 230 (i.e., the combination of the first metal layer 504 and the second metal layer 205) of the baseline configuration shown in FIGS. 4-6 is in contact with approximately 25% of the surface area of the submount 204 (not shown in FIG. 6) that contacts the slider body 202 within the trench 502.

Figure 7:
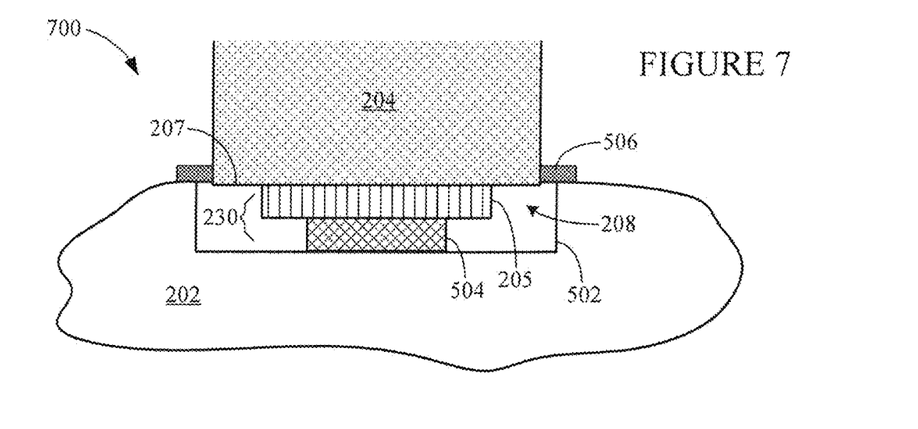
FIGS. 7 and 8 illustrate a slider arrangement that provides an increase in heat transfer between the submount and the slider body in accordance with various embodiments.
Figure 8:
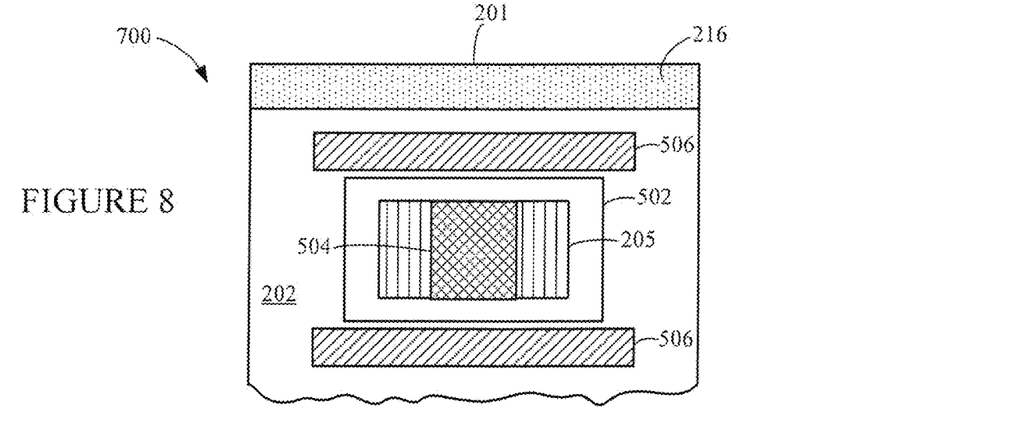

FIGS. 7 and 8 illustrate a slider arrangement 700 that provides for an increase in heat transfer between the submount 204 and the slider body 202 in accordance with various embodiments. In the embodiment shown in FIGS. 7 and 8, the slider body 202 and the submount 204 are physically and thermally connected to each other via a metallization layer 230, which may, but need not necessarily, comprise a first metal layer 504 and a second metal layer 205. In some embodiments, the thermal resistance of each of the first and second metal layers 504 and 205 are about the same (e.g., ~50 K/W in some cases) and greater than that of the slider body (e.g., ~20 K/W). In the configuration shown in FIGS. 7 and 8, the effective coverage of the metallization layer 230 over the end surface 207 of the submount 204 is approximately 30%. It is been determined through computer modeling that a modest increase of about 5% to 10% in coverage of the metallization layer 230 on the end surface 207 of the submount 204 results in an approximately 8 to 10% reduction in temperature at the interface 208 between the submount 204 and slider body 202 when compared to the baseline slider arrangement shown in FIGS. 4-6.

In the particular configuration in which the metallization layer 230 comprises a first metal layer 504 and a second metal layer 205, the second metal layer 205 is shown having a surface area larger than that of the first metal layer 504. As such, the effective coverage of the metallization layer 230 is dictated by the effective coverage of the first metal layer 504 relative to the second metal layer 205. In some embodiments, the surface area of the second metal later 205 can be increased from that shown in FIGS. 7 and 8, such as up to the total surface area of the end surface 207 of the submount 204. According to various embodiments, the first metal layer 504 and the second metal layer 205 shown in FIGS. 7 and 8 are each UBM layers or UBM/solder layers having about same thermal resistance. In other embodiments, the first and second metal layers 504 and 205 are each UBM layers or UBM/solder layers having different thermal resistances.

Figure 9:
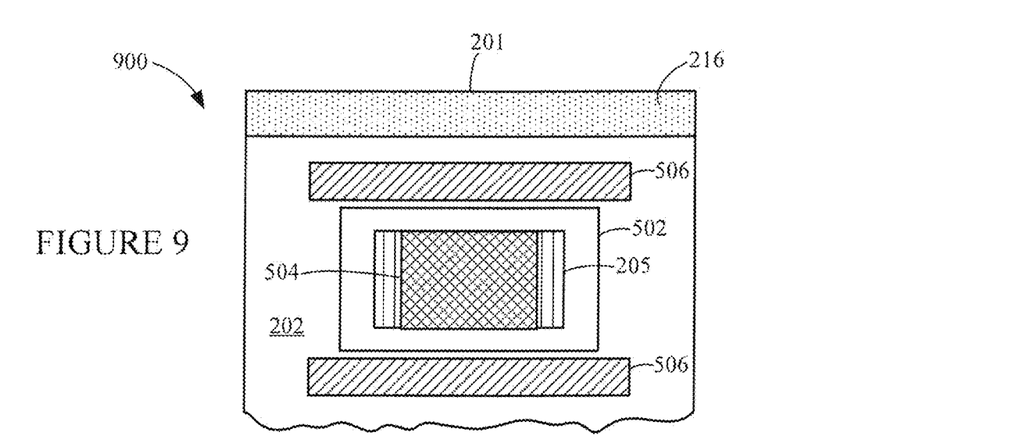
FIG. 9 illustrates a slider arrangement that provides for an increase in heat transfer between the submount and the slider body in accordance with various embodiments.

FIG. 9 illustrates a slider arrangement 900 that provides for an increase in heat transfer between the submount 204 and the slider body 202 in accordance with various embodiments. In the embodiment shown in FIG. 9, the metallization layer 230 (e.g., first and second metallization layers 504 and 205) is in contact with approximately 70% of the surface area of the end surface of the submount 204 adjacent the slider body 202. Although the metallization layer coverage of the end surface of the submount 204 is increased in the embodiment shown in FIG. 9, this increase in metallization layer coverage is contained within the trench 502 so as not to disturb the AR coating 506 on the surface of the slider body 202 adjacent the base of the submount 204. Computer modeling demonstrated that increasing the metallization layer coverage on the submount 204 from approximately 25% (baseline slider arrangement) to about 70% resulted in a temperature reduction at the submount/slider interface of approximately 17% relative to the baseline configuration.

Figure 10:
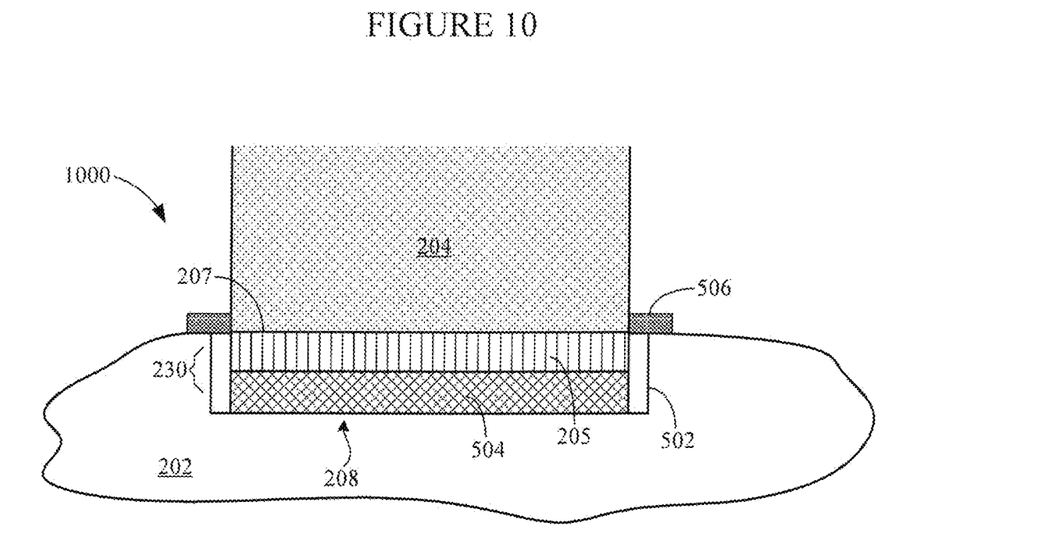
FIGS. 10 and 11 illustrate a slider arrangement that provides for an increase in heat transfer between the submount and the slider body in accordance with various embodiments.
Figure 11:
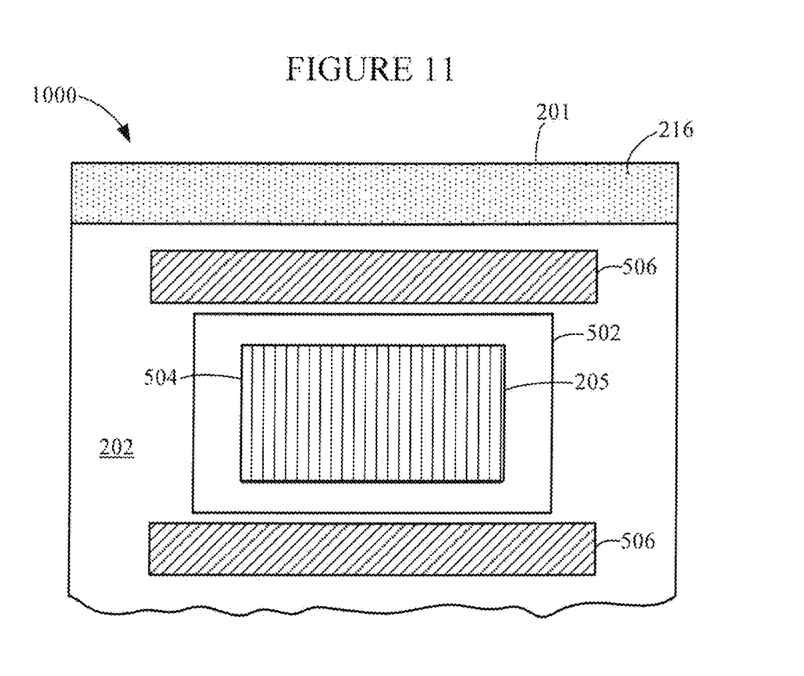

FIGS. 10 and 11 illustrate a slider arrangement 1000 that provides for an increase in heat transfer between the submount 204 and the slider body 202 in accordance with various embodiments. In the embodiment shown in FIGS. 10 and 11, the metallization layer 230 (e.g., first and second metallization layers 504 and 205) is in contact with approximately 100% of the surface area of the end surface 207 of the submount 204 adjacent the slider body 202. It can be seen in FIGS. 10 and 11 that, although the metallization layer coverage of the end surface 207 of the submount 204 is increased to approximately 100%, this increase in metallization layer coverage is contained within the trench 502 so as not to disturb the AR coating 506 on the surface of the slider body 202 adjacent the base of the submount 204. Computer modeling demonstrated that increasing the metallization layer coverage on the submount 204 from approximately 25% (baseline slider arrangement) to about 100% resulted in a temperature reduction at the submount/slider interface 208 of approximately 21% relative to the baseline configuration.

Figure 12:
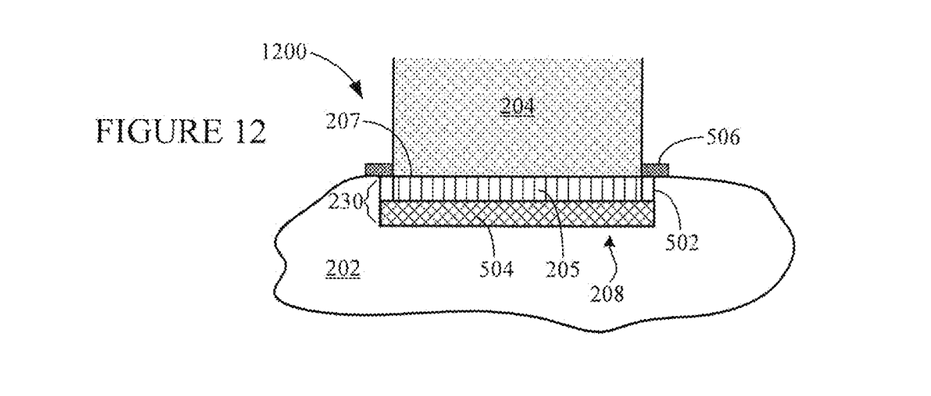
FIG. 12 illustrates a slider arrangement that provides for an increase in heat transfer between the submount and the slider body in accordance with various embodiments.

FIG. 12 illustrates a slider arrangement 1200 that provides for an increase in heat transfer between the submount 204 and the slider body 202 in accordance with various embodiments. In the embodiment shown in FIG. 12, the metallization layer 230 (e.g., first and second metallization layers 504 and 205) is in contact with approximately 100% of the surface area of the end surface 207 of the submount 204 adjacent the slider body 202. The metallization layer 230 shown in FIG. 12 extends beyond the periphery of the end surface 207 of the submount 204 by approximately 10% of the cross-sectional surface area of the submount's end surface 207. The extended portion of the metallization layer 230 beyond the periphery of the submount's end surface 207 provides for enhanced heat transfer between the submount 204 and the slider body 202. Although the metallization layer coverage of the end surface of the submount 204 exceeds the surface area of the submount 204 in the embodiment shown in FIG. 12, this increase in metallization layer surface area is contained within the trench 502 so as not to disturb the AR coating 506 on the surface of the slider body 202 adjacent the base of the submount 204. In the representative embodiment shown in FIG. 12, for example, the metallization layer 230 has been extended to make contact with the lateral walls of the trench 502. Computer modeling demonstrated that increasing the metallization layer coverage on the submount 204 from approximately 25% (baseline slider arrangement) to 100% with an additional 10% extended region resulted in a temperature reduction at the submount/slider interface of approximately 22% relative to the baseline configuration.

Figure 13:
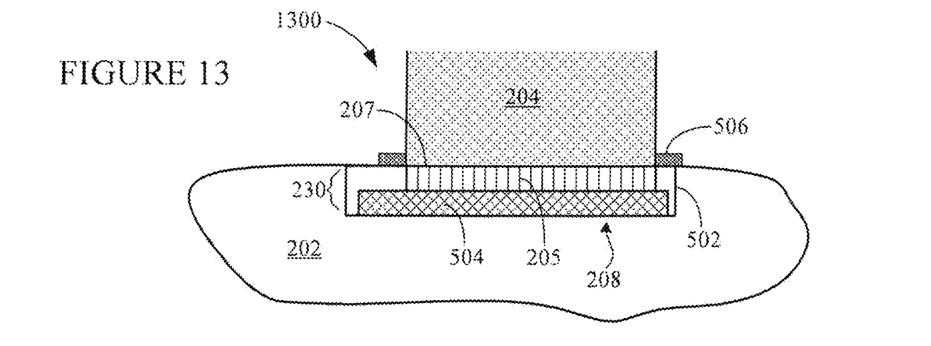
FIGS. 13 and 14 illustrate a slider arrangement that provides for an increase in heat transfer between the submount and the slider body in accordance with various embodiments.
Figure 14:
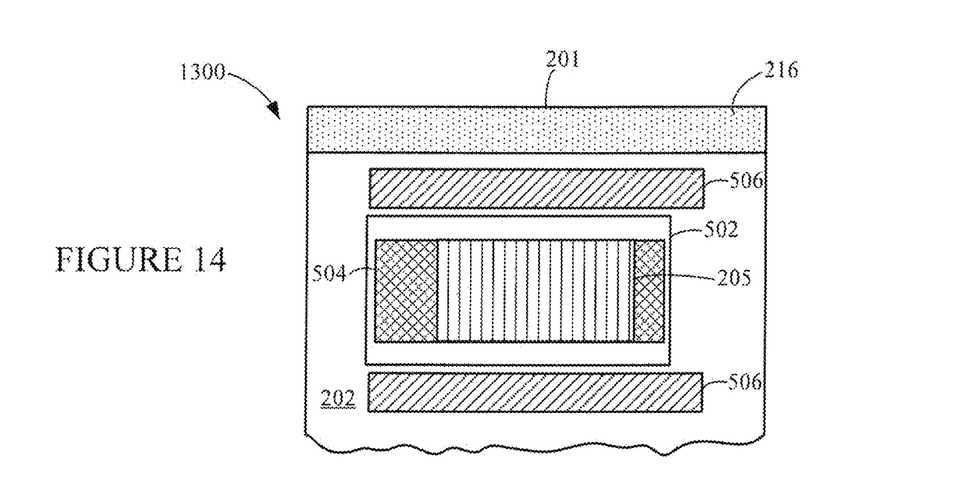

FIGS. 13 and 14 illustrate a slider arrangement 1300 that provides for an increase in heat transfer between the submount 204 and the slider body 202 in accordance with various embodiments. In the embodiment shown in FIGS. 13 and 14, the metallization layer 230 (e.g., first and second metallization layers 504 and 205) is in contact with approximately 100% of the surface area of the end surface 207 of the submount 204 adjacent the slider body 202. The metallization layer 230 shown in FIGS. 13 and 14 extends beyond the periphery of the end surface 207 of the submount 204 by approximately 125% of the cross-sectional surface area of the submount's end surface 207. In order to accommodate the extended region of the metallization layer 230 within the trench 502, the trench 502 has been extended relative to the baseline configuration. It is noted that, in the embodiment shown in FIGS. 13 and 14, the trench 502 is extended in a direction parallel to the trailing edge of the slider body 502 due to positioning of the AR coating 506. The increase in metallization layer coverage is contained within the trench 502 so as not to disturb the AR coating 506 on the surface of the slider body 202 adjacent the base of the submount 204. Computer modeling demonstrated that increasing the metallization layer coverage on the submount 204 from approximately 25% (baseline slider arrangement) to 100% with an additional 25% extended region resulted in a temperature reduction at the submount/slider interface of approximately 22.5% relative to the baseline configuration.

Figure 15:
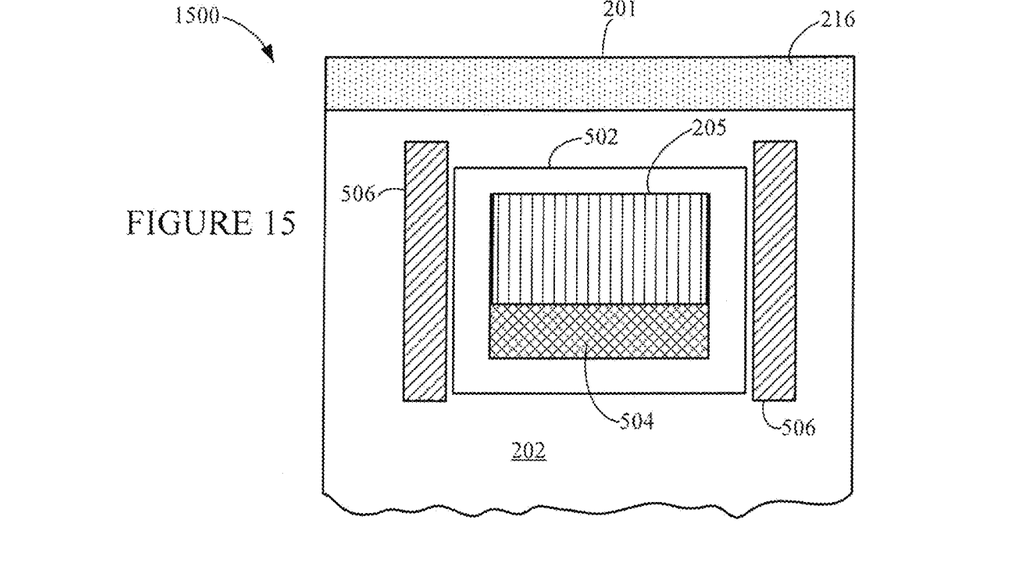
FIGS. 15 and 16 illustrate a slider arrangement that provides for an increase in heat transfer between the submount and the slider body in accordance with various embodiments.
Figure 16:
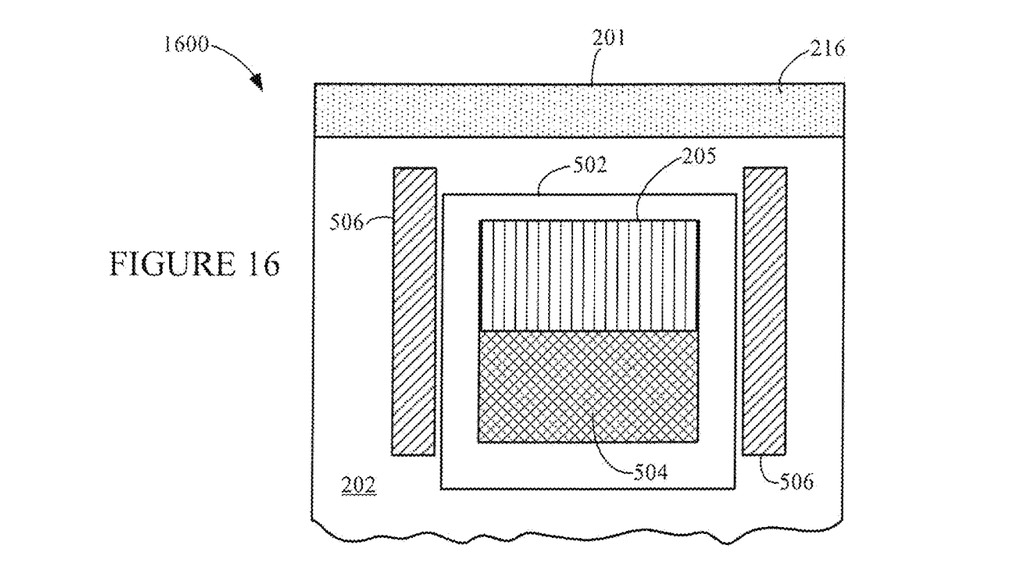

FIGS. 15 and 16 illustrate slider arrangements 1500 and 1600 that provide for an increase in heat transfer between the submount 204 and the slider body 202 in accordance with various embodiments. In the embodiments shown in FIGS. 15 and 16, the trench 502 is extended in a direction normal to the trailing edge 201 of the slider body 202 in order to accommodate an extended region of the metallization layer 230 disposed between the submount 204 and the slider body 202. It is noted that the extent to which the trench 502 can be expanded in a lateral direction (i.e., parallel with the trailing edge 201) is limited due to the dimensions of the slider body 202. However, a greater opportunity for expanding the trench 502 is available in the down-track direction (i.e., normal to the trailing edge 201).

In order to accommodate a larger trench 502 in the down-track direction, the AR coating 506 is positioned at locations lateral of the trench 502, with a longitudinal axis extending normal to the trailing edge 201 of the slider body 202. In the embodiment shown in FIG. 15, the trench 502 is extended in the down-track direction of the slider body 202 to accommodate an extended region of the metallization layer 230 having a surface area equal to approximately 50% of the surface area of the end surface of the submount 204. As such, the metallization layer 230 has an effective surface area of approximately 150% of the surface area of the submount's end surface. In FIG. 16, the slider arrangement 1600 includes an extended trench region 502 that accommodates a metallization layer having a surface area equal to approximately 100% of the surface area of the end surface of the submount 204. As such, the metallization layer 230 has an effective surface area of approximately 200% of the surface area of the end surface of the submount 204.

Figure 17:
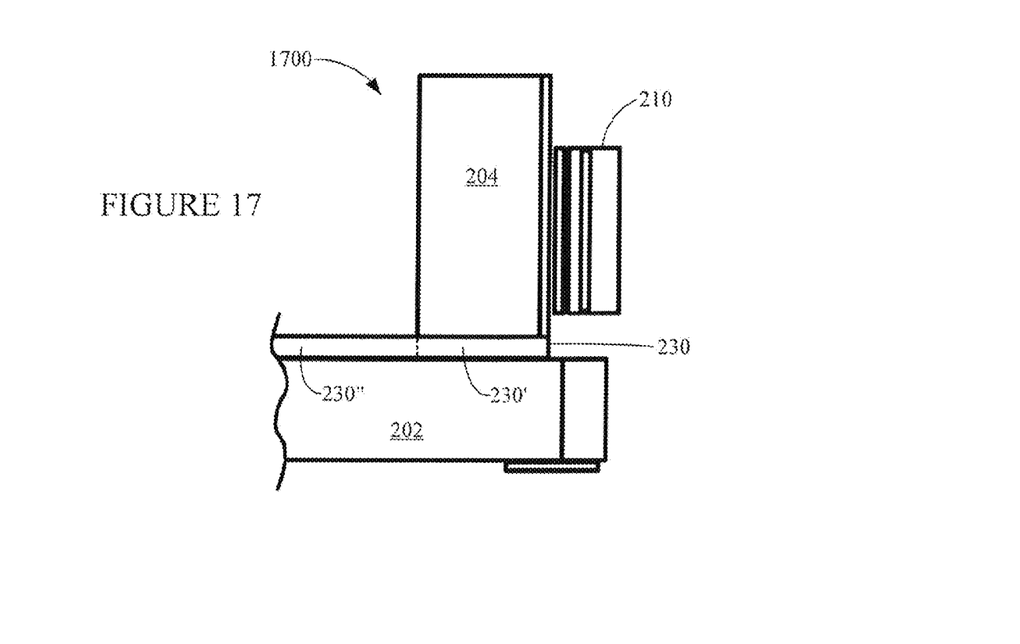
FIGS. 17 and 18 illustrate a slider arrangement that provides for an increase in heat transfer between the submount and the slider body in accordance with various embodiments.
Figure 18:
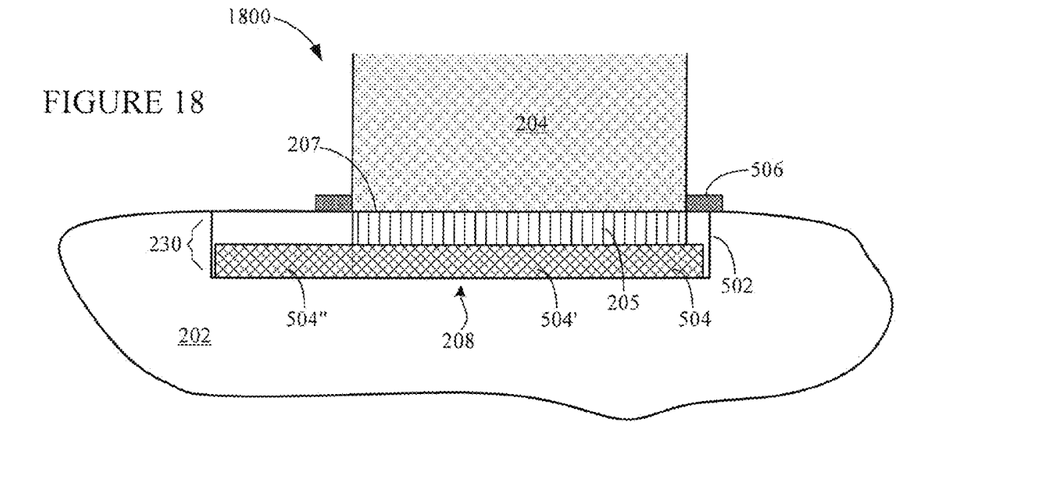

Turning now to FIGS. 17 and 18, there is illustrated a slider arrangement 1700 that provides for an increase in heat transfer between the submount 204 and the slider body 202 in accordance with various embodiments. The slider arrangement 1700 shown in FIGS. 17 and 18 includes a metallization layer 230 that covers the surface area of the submount's end surface and further includes an extended portion that extends beyond the periphery of the submount 204 in the down-track direction of the slider body 202. In particular, the metallization layer 230 includes a first region 230' that covers approximately 100% of the surface area of the submount's end surface and a second region 230" that extends beyond the periphery of the submount 204 in a down-track direction of the slider body 202. In the embodiment shown in FIG. 18, which includes a first metal layer 504 and a second metal layer 205, the first metal layer 504 includes a first region 504' that covers approximately 100% of the surface area of the second metal layer 205 and a second region 504" that extends beyond the periphery of the submount 204 in a down-track direction of the slider body 202. The trench 502 provided on the surface of the slider body 202 is of sufficient size to accommodate an enlarged region of the metallization layer 230 that can range between approximately 1 and 100% of the surface area of the end surface of the submount 204. According to some embodiments, the metallization layer 230 can be extended from the submount 204 in a down-track direction, with thickness of approximately 10 μm, which results in a reduction of thermal resistance at the submount/slider body interface of approximately 20% relative to the baseline slider arrangement.

Figure 19:
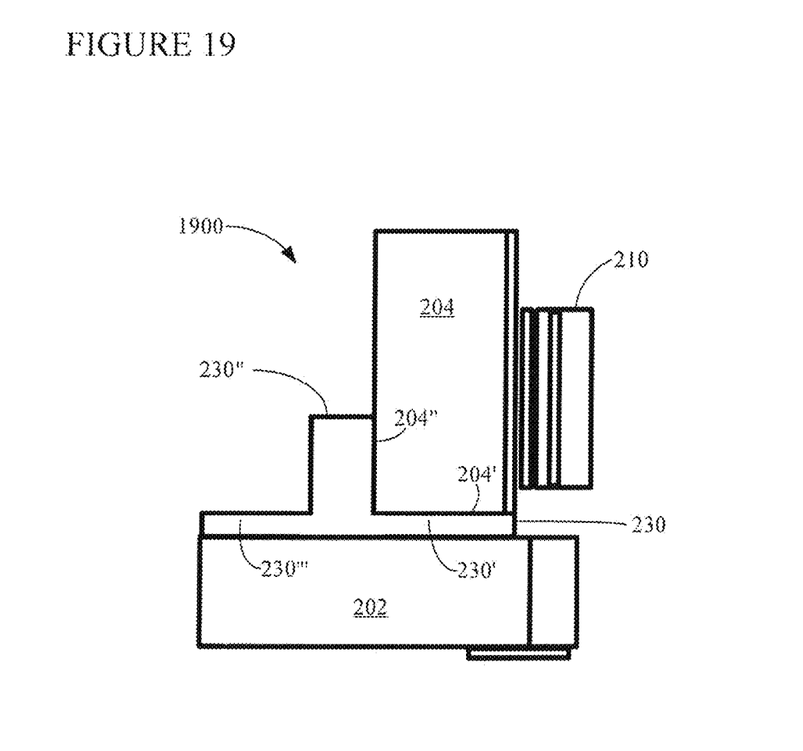
FIG. 19 illustrates a slider arrangement that provides for an increase in heat transfer between the submount and the slider body in accordance with various embodiments.

FIG. 19 illustrates a slider arrangement 1900 that provides for an increase in heat transfer between the submount 204 and the slider body 202 in accordance with various embodiments. The slider arrangement 1900 shown in FIG. 19 includes a metallization layer 230 which includes an extended region that encompasses at least one side surface of the submount 204. In particular, the submount 204 includes an end surface 204' at an interface between the submount 204 and the slider body 202 and a multiplicity of side surfaces that extend from the end surface. The metallization layer 230 shown in FIG. 19 includes a first region 230' between the end surface 204' and the slider body 202 and an extended region which includes a second region 230" and an optional third region 230'''. The second metallization region 230" extends upwardly along a side surface 204" of the submount 204, covering between approximately 10% and 50% of the side surface 204" for example. Extending further along in the down-track direction is a third metallization region 230''' adjacent the second metallization region 230". The metallization layer configuration shown in FIG. 19 results in a reduction of thermal resistance at the interface between the submount 204 and the slider body 202 by approximately 33% relative to the baseline slider arrangement.

Figure 20:
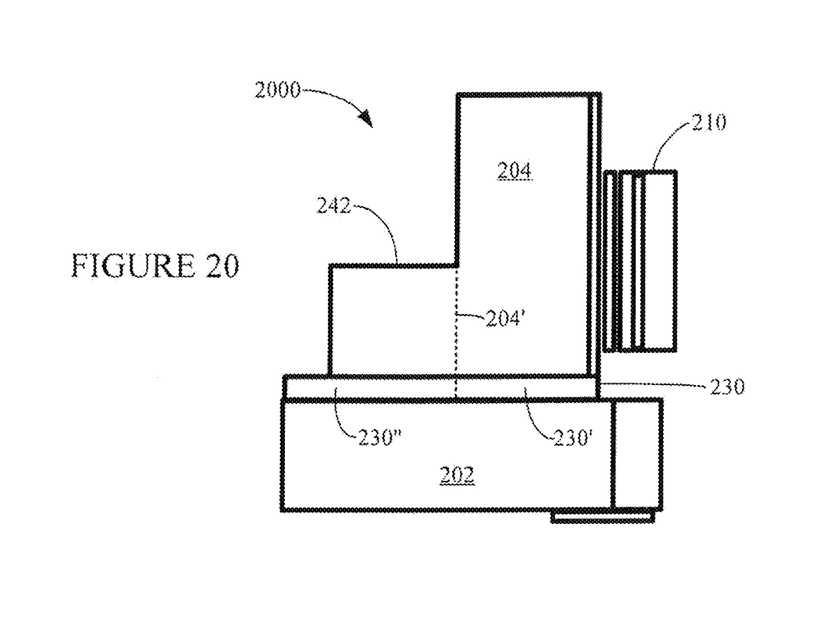
FIG. 20 illustrates a slider arrangement that provides for an increase in heat transfer between the submount and the slider body in accordance with various embodiments.

FIG. 20 illustrates the slider arrangement 2000 that provide for an increase in heat transfer between the submount 204 and the slider body 202 in accordance with various embodiments. The slider arrangement 2000 shown in FIG. 20 includes a metallization layer 230 comprising a first portion 230' covering the end surface of the submount 204 and an extended second portion 230" that extends beyond the periphery of the submount 204, such as between about 10 and 200% (and even more than 200%) of the cross-sectional surface area of the submount 204. In the embodiment shown in FIG. 20, the submount 204 is formed to have a generally L-shaped configuration with a lateral portion 242 that contacts a surface of the second portion 230" of the metallization layer 230. The lateral portion 242 is a projection of the submount 204 that extends in a down-track direction of the slider body 202 and is formed from the same material as the submount (e.g., Si). In some embodiments, the lateral portion 242 is dimensioned so that it provides for a contact area at the submount/slider body interface that is about two times larger than the submounts of other embodiments. The slider arrangement 2000 shown in FIG. 20 provides for a reduction in thermal resistance at the interface between the submount 204 and slider body 202 of about 50% relative to the baseline slider arrangement.

Figure 21:
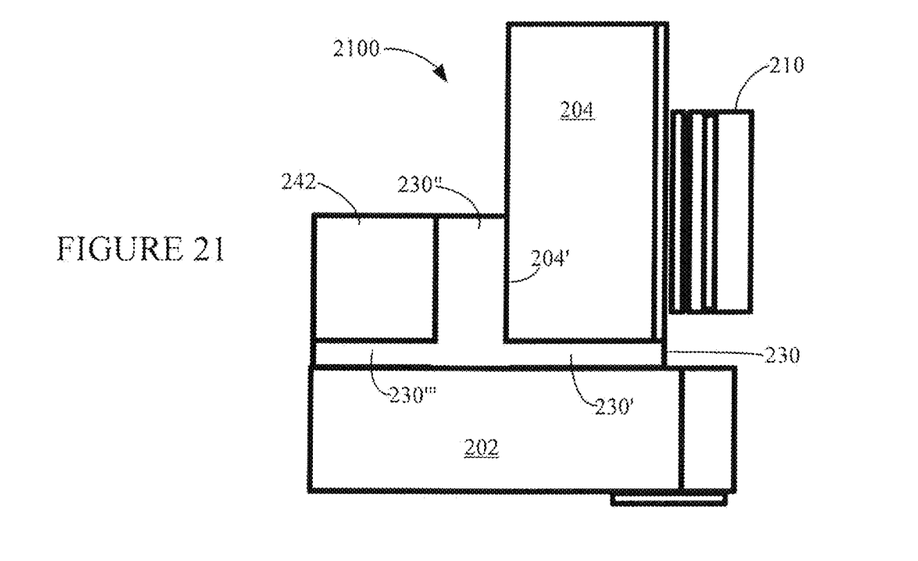
FIG. 21 illustrates a slider arrangement that provides for an increase in heat transfer between the submount and the slider body in accordance with various embodiments.

FIG. 21 illustrates a slider arrangement 2100 that provide for an increase in heat transfer between the submount 204 and the slider body 202 in accordance with various embodiments. The slider arrangement 2100 shown in FIG. 21 includes a metallization layer 230 comprising a first metallization region 230' at the interface between the submount 204 and slider body 202, a second metallization region 230" peripheral to and extending along at least one side surface 204' of the submount 204, and a third metallization region 230''' that extends from the second metallization region 230" along the surface of the slider body 202. Adjacent to the second metallization region 230" and the third metallization region 230''' is an auxiliary structure 242 that enhances heat transfer from the sidewall 204' of the submount 204.

Figure 22:
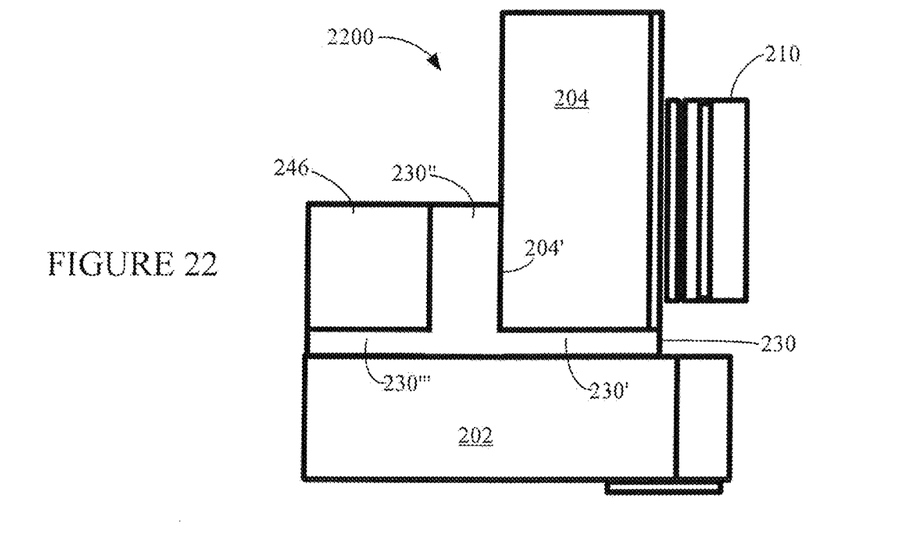
FIG. 22 illustrates a slider arrangement that provides for an increase in heat transfer between the submount and the slider body in accordance with various embodiments.

In the embodiment shown in FIG. 21, the auxiliary structure 242 is formed from the same material as that used for the submount 204 (e.g., silicon). In other embodiments, such as that shown in FIG. 22 (which has essentially the same configuration of the slider arrangement shown in FIG. 21), the auxiliary structure 242 can be formed of a material different from the submount 204. For example, and with reference to the slider arrangement 2200 shown in FIG. 22, the auxiliary structure 246 can be formed of a metal or metal alloy, such as copper. The slider arrangements 2100 and 2200 shown in FIGS. 20 and 21 provide for a reduction in thermal resistance at the interface between the submount 204 and slider body 202 of about 50% relative to the baseline slider arrangement.

Figure 23:
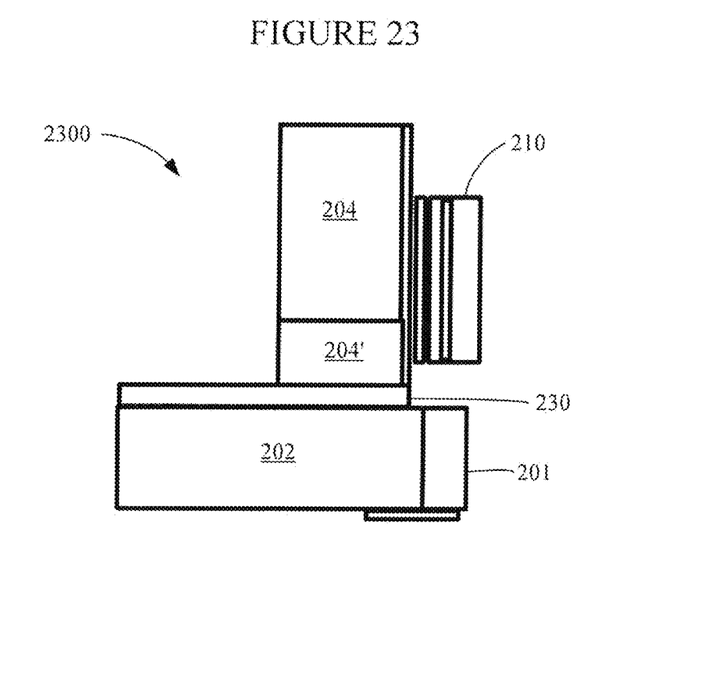
FIGS. 23 and 24 illustrate a slider arrangement that provides for an increase in heat transfer between the submount and the slider body in accordance with various embodiments.
Figure 24:
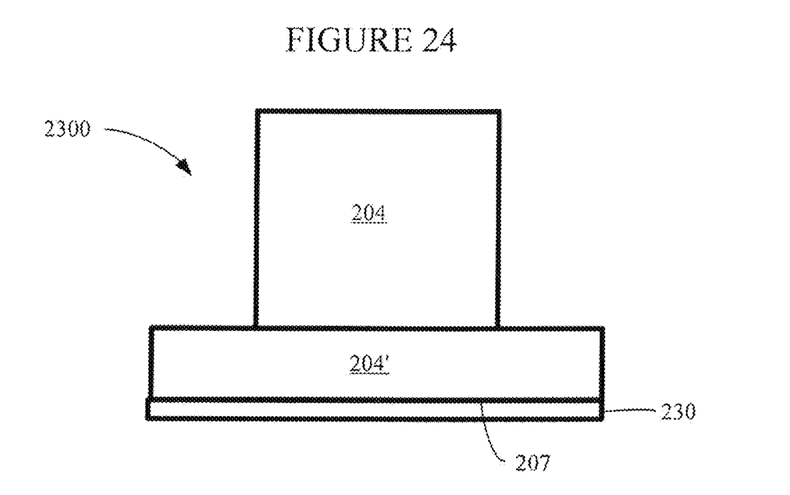

FIG. 23 illustrates a slider arrangement 2300 that provides for an increase in heat transfer between the submount 204 and the slider body 202 in accordance with various embodiments. In FIG. 23, the submount 204 includes lateral projections 204' at the base of the submount 204 that extend laterally in a direction parallel to the trailing edge 201 of the slider body 202. As can be seen in FIG. 24, which is a side view of FIG. 23, a metallization layer 230 covers the end surface 207 of the submount 204 and extends beyond the periphery of the end surface 207 in a down-track direction along the surface of the slider body 202. The metallization layer configuration shown in FIGS. 23 and 24 provides for a reduction in thermal resistance at the interface between the submount 204 and the slider body 202 of approximately 50% relative to the baseline slider arrangement.

Figure 25:
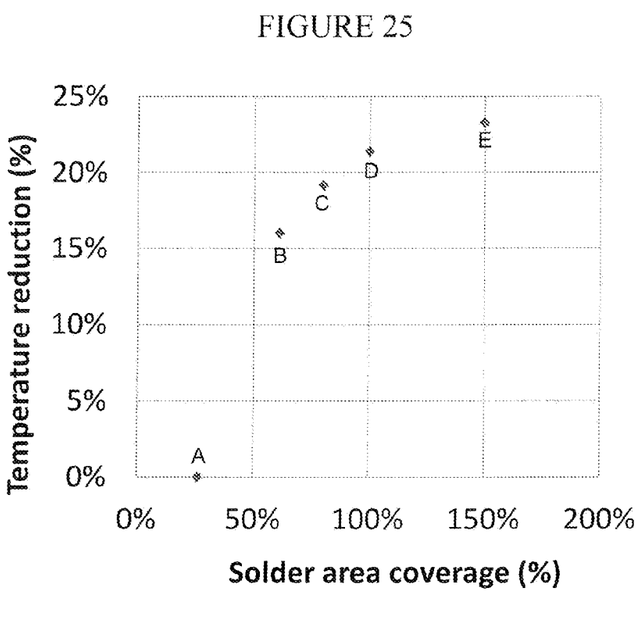
FIG. 25 is a graph showing temperature reduction versus metallization layer coverage of a submount in accordance with various embodiments.

FIG. 25 is a graph showing temperature reduction (percentage) versus metallization layer coverage (percentage) over a submount in accordance with various embodiments. Five data points are shown in FIG. 25, each of which corresponds to one of the slider arrangements described hereinabove. Data point A represents the baseline slider arrangement shown in FIGS. 4-6, in which metallization layer covers approximately 25% of the end surface of the submount. Because the baseline slider arrangement is used as a standard for purposes of comparison, the temperature reduction percentage associated with point A is 0%, and each of the other data points of FIG. 25 is normalized to the baseline slider arrangement data.

Data point B represents the slider arrangement shown in FIGS. 17 and 18, data point C represents the slider arrangement shown in FIG. 19, data point D represents the slider arrangement shown in FIG. 20, and data point E represents the slider arrangement shown in FIG. 21. Each of the slider arrangements associated with data points B through E demonstrates that a significant reduction in temperature at the submount/slider body interface can be achieved in accordance with embodiments of the disclosure. The data of FIG. 25 reflects the following percentage reductions in submount/slider body interface temperature relative to the baseline slider arrangement realized by use of the aforementioned slider arrangements: data point B (~16% reduction), data point C (~18% reduction), data point D (~21% reduction), and data point E (~22% reduction).

Figure 26:
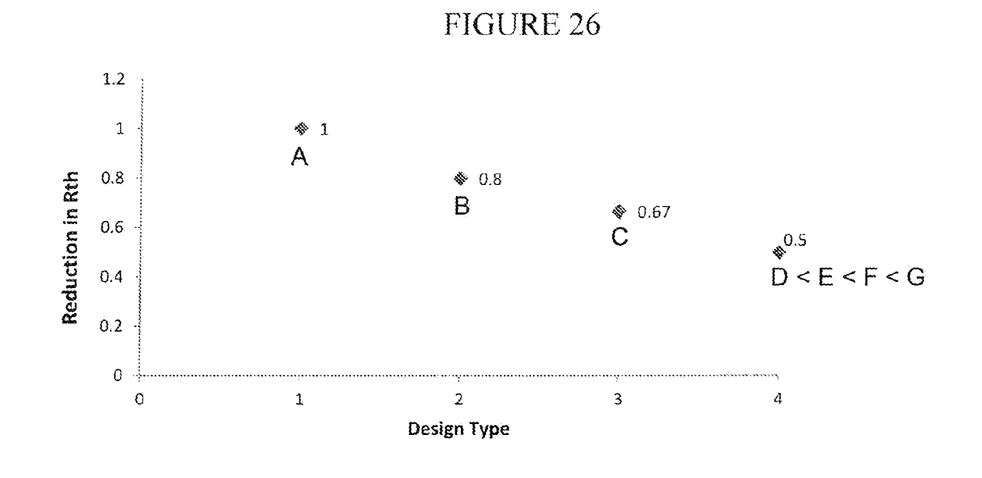
FIG. 26 is a graph showing reduction in thermal resistance as a function of the various slider arrangement embodiments of the disclosure.

FIG. 26 is a graph showing reduction in thermal resistance ($R_{th}$) as a function of the various slider arrangement embodiments of the disclosure. As in the case of FIG. 25, data point A represents the baseline slider arrangement shown in FIGS. 4-6, data point B represents the slider arrangement shown in FIGS. 17 and 18, data point C represents the slider arrangement shown in FIG. 19, data point D represents the slider arrangement shown in FIG. 20, and data point E represents the slider arrangement shown in FIG. 21. Data points F, and G of FIG. 26 represent the slider arrangements shown in FIGS. 22 and 23-24, respectively. Each of the slider arrangements associated with data points B through D demonstrates that a significant reduction in thermal resistance at the submount/slider body interface can be achieved in accordance with embodiments of the disclosure. The data of FIG. 26 reflects the following reductions in thermal resistance at the submount/slider body interface realized by use of the aforementioned slider arrangements: data point B (~20% reduction), data point C (~33% reduction), and data point D (~50% reduction). For each of data points E, F, and G, reductions in thermal resistance of more than 50% at the submount/slider body interface were realized.

Slider arrangements of the disclosure provide for enhanced transfer of heat produced by a laser diode from a submount supporting the laser diode to a slider body of a read/write transducer according to various embodiments. In some embodiments, a reduction in thermal resistance at the submount/slider body interface of up to about 50% can be achieved, resulting in a reduction in temperature at the laser diode of up to about 20% relative to a baseline slider arrangement. Such reductions in interface temperature results in smaller temperature rises per pulse at the junction of the laser diode, which can provide for improved power stability of the laser diode of up to about 20%. A 20% reduction in junction temperature rise, for example, would be equivalent to an approximate 20% reduction in the number of power instabilities of the laser diode (e.g., a significantly reduced likelihood of mode hopping).

Embodiments of the present disclosure provide for reduced submount/slider body interface temperatures for future slider arrangements that will require smaller (e.g., shorter in the vertical direction) submounts. Future hard disk drives will continue the trend of providing higher storage capacity in smaller (e.g., thinner) form factors. The vertical height of the submount has a bearing on the overall thickness of a disk drive. Shorter submounts can help to reduce overall drive thickness. However, modeling of smaller submount designs has demonstrated that next generation submounts are at near-uniform temperature, indicating that the slider arrangement is unable to efficiently remove energy from the submount to the slider body. Embodiments of the disclosure provide for increased transport of laser diode heat from the submount to the slider body by reducing thermal resistance between the submount and the slider body for current and future disk drive designs.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
a slider of a magnetic recording head;
a submount, an interface defined between the slider and the submount;
a laser diode connected to the submount;
an antireflective coating on the slider; and
a metal layer at the interface between the slider and the submount, wherein the metal layer avoids the antireflective coating and connects at least about 30% of the surface area of the submount at the interface directly to the slider and serves as a thermal conduction pathway between the submount and the slider.

2. The apparatus of claim 1, wherein the metal layer connects at least about 50% of the surface area of the submount at the interface to the slider.

3. The apparatus of claim 1, wherein the metal layer connects at least about 70% of the surface area of the submount at the interface to the slider.

4. The apparatus of claim 1, wherein the metal layer connects about 100% of the surface area of the submount at the interface to the slider.

5. The apparatus of claim 1, wherein the metal layer extends beyond a periphery of the submount at the interface and along a surface of the slider by an area equal to at least about 20% of the surface area of the submount at the interface.

6. The apparatus of claim 1, wherein the metal layer extends beyond a periphery of the submount at the interface and along a surface of the slider by an area equal to at least about 35% of the surface area of the submount at the interface.

7. The apparatus of claim 1, wherein the metal layer extends beyond a periphery of the submount at the interface and along a surface of the slider by an area equal to at least about 50% of the surface area of the submount at the interface.

8. The apparatus of claim 1, wherein:
the submount comprises an end surface at the interface and a plurality of sides extending from the end surface; and
the metal layer extends beyond a periphery of the end surface and along at least a portion of at least one of the sides.

9. The apparatus of claim 1, wherein the submount has an end surface at the interface with a generally L shaped configuration.

10. The apparatus of claim 1, wherein:
the submount comprises an end surface at the interface and a plurality of sides extending from the end surface;
the metal layer extends beyond a periphery of the end surface and along a surface of the slider; and
an auxiliary structure is disposed on a portion of the metal layer extending along the surface of the slider, the auxiliary structure thermally coupled to at least one of the sides of the submount.

11. The apparatus of claim 10, wherein the auxiliary structure is formed from the material used to form the submount.

12. The apparatus of claim 10, wherein the auxiliary structure is formed from a metal or a metal alloy different from that of the metal layer.

13. The apparatus of claim 1, wherein:
the submount comprises an end surface at the interface and a plurality of sides extending from the end surface; and
the metal layer extends beyond a periphery of the end surface and along at least a portion of at least two of the sides.

14. The apparatus of claim 1, wherein the antireflective coating is proximate a base of the submount and spaced from the interface between the submount and the slider.

15. An apparatus, comprising:
a slider of a magnetic recording head, the slider comprising an air bearing surface and a surface opposing the air bearing surface;
a trench on the opposing surface
a first metal layer in the trench;
a submount having an end surface terminating at an interface defined between the slider and the submount;
a laser diode connected to the submount; and
a second metal layer provided on the end surface of the submount;
wherein the first metal layer connects at least about 30% of the surface area of the end surface to the opposing surface of the slider via the second metal layer and serves as a thermal conduction pathway between the submount and the slider.

16. The apparatus of claim 15, wherein the first metal layer connects at least about 50% of the surface area of the end surface to the opposing surface of the slider via the second metal layer.

17. The apparatus of claim 15, wherein the first metal layer connects at least about 70% of the surface area of the end surface to the opposing surface of the slider via the second metal layer.

18. The apparatus of claim 15, wherein the first metal layer connects about 100% of the surface area of the end surface to the opposing surface of the slider via the second metal layer.

19. The apparatus of claim 15, wherein the first metal layer extends beyond a periphery of the submount at the interface and along the opposing surface of the slider by an area equal to at least about 20% of the surface area of the submount at the interface.

20. The apparatus of claim 15, wherein the first metal layer extends beyond a periphery of the submount at the interface and along the opposing surface of the slider by an area equal to at least about 35% of the surface area of the submount at the interface.

21. The apparatus of claim 15, wherein the first metal layer extends beyond a periphery of the submount at the interface and along the opposing surface of the slider by an area equal to at least about 50% of the surface area of the submount at the interface.

* * * * *